US009260640B1

(12) United States Patent
Mac Murray et al.

(10) Patent No.: US 9,260,640 B1
(45) Date of Patent: Feb. 16, 2016

(54) REVERSIBLE THERMOSET ADHESIVES

(71) Applicant: Cornerstone Research Group, Inc., Dayton, OH (US)

(72) Inventors: Benjamin C. Mac Murray, Ithaca, NY (US); Tat H. Tong, Bellbrook, OH (US); Richard D. Hreha, Centerville, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 10 days.

(21) Appl. No.: 13/973,575

(22) Filed: Aug. 22, 2013

Related U.S. Application Data

(60) Provisional application No. 61/716,876, filed on Oct. 22, 2012, provisional application No. 61/778,686, filed on Mar. 13, 2013.

(51) Int. Cl.
*C08G 73/06* (2006.01)
*C08L 63/00* (2006.01)
*C09J 179/08* (2006.01)
*C09J 171/12* (2006.01)

(52) U.S. Cl.
CPC .............. *C09J 179/08* (2013.01); *C09J 171/12* (2013.01)

(58) Field of Classification Search
CPC .................................................... C09J 179/08
USPC ......................................... 525/530; 528/423
See application file for complete search history.

(56) References Cited

U.S. PATENT DOCUMENTS

| 4,513,125 | A | 4/1985 | Holubka |
| 6,337,384 | B1 | 1/2002 | Loy et al. |
| 6,403,753 | B1 * | 6/2002 | Loy et al. .................. 528/73 |
| 6,825,315 | B2 * | 11/2004 | Aubert ...................... 528/393 |
| 6,933,361 | B2 | 8/2005 | Wudl et al. |
| 7,346,259 | B1 | 3/2008 | Jen et al. |
| 7,858,699 | B2 | 12/2010 | Liu et al. |
| 2012/0261064 | A1 | 10/2012 | Boday et al. |
| 2013/0059988 | A1 | 3/2013 | Palmese et al. |

FOREIGN PATENT DOCUMENTS

EP        2551093 B1      1/2014
JP    2003183348 A  *  7/2003  ............ C08G 18/78

OTHER PUBLICATIONS

Chino et al., Machine translation in English of JP 2003-183348 A, Jul. 3, 2003.*
Tian et al., "A thermally remendable epoxy resin", Journal of Materials Chemistry, 2009, vol. 19, p. 1289-1296.*

(Continued)

*Primary Examiner* — David Karst
(74) *Attorney, Agent, or Firm* — Dinsmore & Shohl LLP

(57) ABSTRACT

Embodiments of a reversible thermoset adhesive formed by incorporating thermally-reversible cross-linking units and a method for making the reversible thermoset adhesive are provided. One approach to formulating reversible thermoset adhesives includes incorporating dienes, such as furans, and dienophiles, such as maleimides, into a polymer network as reversible covalent cross-links using Diels Alder cross-link formation between the diene and dienophile. The chemical components may be selected based on their compatibility with adhesive chemistry as well as their ability to undergo controlled, reversible cross-linking chemistry.

23 Claims, 4 Drawing Sheets

(56) References Cited

OTHER PUBLICATIONS

Peterson et al., "Reversibly Cross-Linked Polymer Gels as Healing Agents for Epoxy-Amine Thermosets", 2009, vol. 1, No. 5, p. 992-995.*

Bergmann et al., "Mendable polymers", The Royal Society of Chemistry, J. Mater. Chem., vol. 18, pp. 41-62, 2008.

Kim et al., "Reversible dry micro-fibrillar adhesives with thermally controllable adhesion", The Royal Society of Chemistry, Soft Matter, vol. 5, pp. 3689-3693, 2009.

Luo et al., "A Thermoplastic/Thermoset Blend Exhibiting Thermal Mending and Reversible Adhesion", Applied Materials & Interfaces, vol. 1, No. 3, pp. 612-620, 2009.

Magna et al., "Thermally reversible crosslinked polyethylene using Diels-Alder reaction in molten state", Reactive & Functional Polymers, vol. 70, pp. 442-448, 2010.

Peterson, "Development of Remendable Materials Using Reversible Bonds", Chemical & Biological Engineering Department, Drexel University, Materials Center of Excellence, www.chemeng.drexel.edu/palmasegroup/research/peterson, 2009.

* cited by examiner

REVERSIBLE THERMOSET ADHESIVES

STATEMENT REGARDING FEDERALLY SPONSORED RESEARCH OR DEVELOPMENT

This invention was made with government support by the Office of the Secretary of Defense under Contract Number FA9300-08-M-3112 and National Aeronautics and Space Administration (NASA) under Contract Number NNX11CC10C. The government has certain rights in this application pursuant to the contract.

CROSS-REFERENCE TO RELATED APPLICATIONS

This invention is related to U.S. Provisional Application 61/716,876 filed Oct. 22, 2012 and to U.S. Provisional Application 61/778,686 filed Mar. 13, 2013, which are incorporated by reference herein in their entirety.

TECHNICAL FIELD

Embodiments of the present disclosure are generally related to reversible thermoset resins, and are specifically related to reversible thermoset adhesives that achieve reversibility over one or more heating and cooling cycles.

SUMMARY

Conventional adhesive resins are materials that are applied as a low-viscosity liquid and transform into a strong, tough solid that bonds two surfaces together. For a high performance adhesive, the liquid-solid transformation is typically a non-reversible thermosetting polymerization chemical reaction that leads to a cross-linked network (thermoset adhesives). An adhesive that enables facile debonding and separation of the bonded surfaces on demand is highly desirable, as one can easily disassemble or selectively remove the bonded parts for repair, maintenance and re-assembly.

For example, a reversible thermoset resin can be advantageous in producing polymer composite parts, especially large, thick components or syntactic materials, by decoupling the thermal polymerization step from the part fabrication step. Such decoupling will avoid the hazard of a run-away exothermic reaction in the usual curing process. Furthermore, such resin has the potential to affect a healing mechanism to a damaged part by going through the debonding-bonding cycle to eliminate cracks and fracture surfaces. Such a healing mechanism can be achieved at room temperature or elevated temperature, depending on the polymer chain mobility of the specific polymer matrix.

When a reversible thermoset resin is formulated for use in an adhesive, for example, a pressure sensitive adhesive (PSA), the material provides the potential for significant environmental and cost advantages. In the manufacture of PSA adhesive tapes, organic solvents are used to dissolve the main polymer, the tackifier, and the crosslinking agent. A PSA based on the reversible adhesive resin can be thermally liquefied and applied to a substrate, thus reducing or completely eliminating the need of solvent in the manufacturing process of making the adhesive tape. This reduces the infrastructure and maintenance cost of environmental installations necessary for organic solvent recovery and incineration as well as, the initial cost of the organic solvent and the potential negative effects escaping volatile organic compounds (VOCs) may have on the environment.

Despite the above noted benefits of reversible thermoset adhesives, there is a demand for reversible thermoset adhesives which achieves reversibility, especially reversibility over one or more heating and cooling cycles. Consequently, embodiments of the present disclosure are directed to reversible thermoset adhesives, which can reverse or break cross-links in a cross-linked polymer network upon exposure to temperature. As further elaborated below, exemplary embodiments of the present reversible thermoset adhesives (for example, epoxy or polyurethane based adhesives) achieve reversibility as demonstrated by a transition from a "set" state to a "reversed" state wherein the wherein the reversed state is a liquid or semi-solid state having a viscosity of 300 Pa·s or less and an adhesive tensile strength or 5 psi or less.

In accordance with another embodiment of the present disclosure, a reversibly cross-linked polymer network comprising one or more dienes, one or more dienophiles, and one or more property-modifying molecular moieties is described. The one or more dienes comprise the formula I (below)

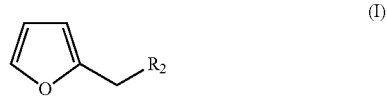

(I)

wherein $R_1$ is selected from the group consisting of amines, alcohols, thiols, isocyanates, methacrylates, alkyl esters, benzoates, isothiocyanates, aldehydes, maleimides, thioureas, and thiosemicarbazides. The one or more dienophiles comprise the formula II (below) wherein $R_2$ is selected from the group consisting of hydrogen, alkyls, aromatics, aliphatics, heteroaromatics, and heteroaliphatics.

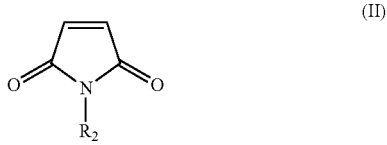

(II)

The reversibly cross-linked polymer network is operable to be in a set state or a reversed state.

In accordance with another embodiment of the present disclosure, a method for making a reversible thermoset adhesive is described. The method comprises providing one or more dienes, one or more dienophiles, and one or more property-modifying molecular moieties, wherein the one or more dienes comprise a furan and the one or more dienophiles comprise a maleimide and wherein the furan comprises amines, alcohols, thiols, isocyanates, methacrylates, alkyl esters, benzoates, isothiocyanates, aldehydes, maleimides, thioureas, or thiosemicarbazides. The method further comprises reacting the dienes, dienophiles, and property-modifying molecular moieties using the Diels-Alder reaction to form a thermoset adhesive comprising reversible covalent bonds, and curing the thermoset adhesive to yield the reversible thermoset adhesive, wherein the reversibly thermoset adhesive is in a set state or a reversed state.

DESCRIPTION OF THE SEVERAL VIEWS OF THE DRAWINGS

The following detailed description of the preferred embodiments of the present disclosure can best be understood when read in conjunction with the following drawings.

DETAILED DESCRIPTION

Figure 1:
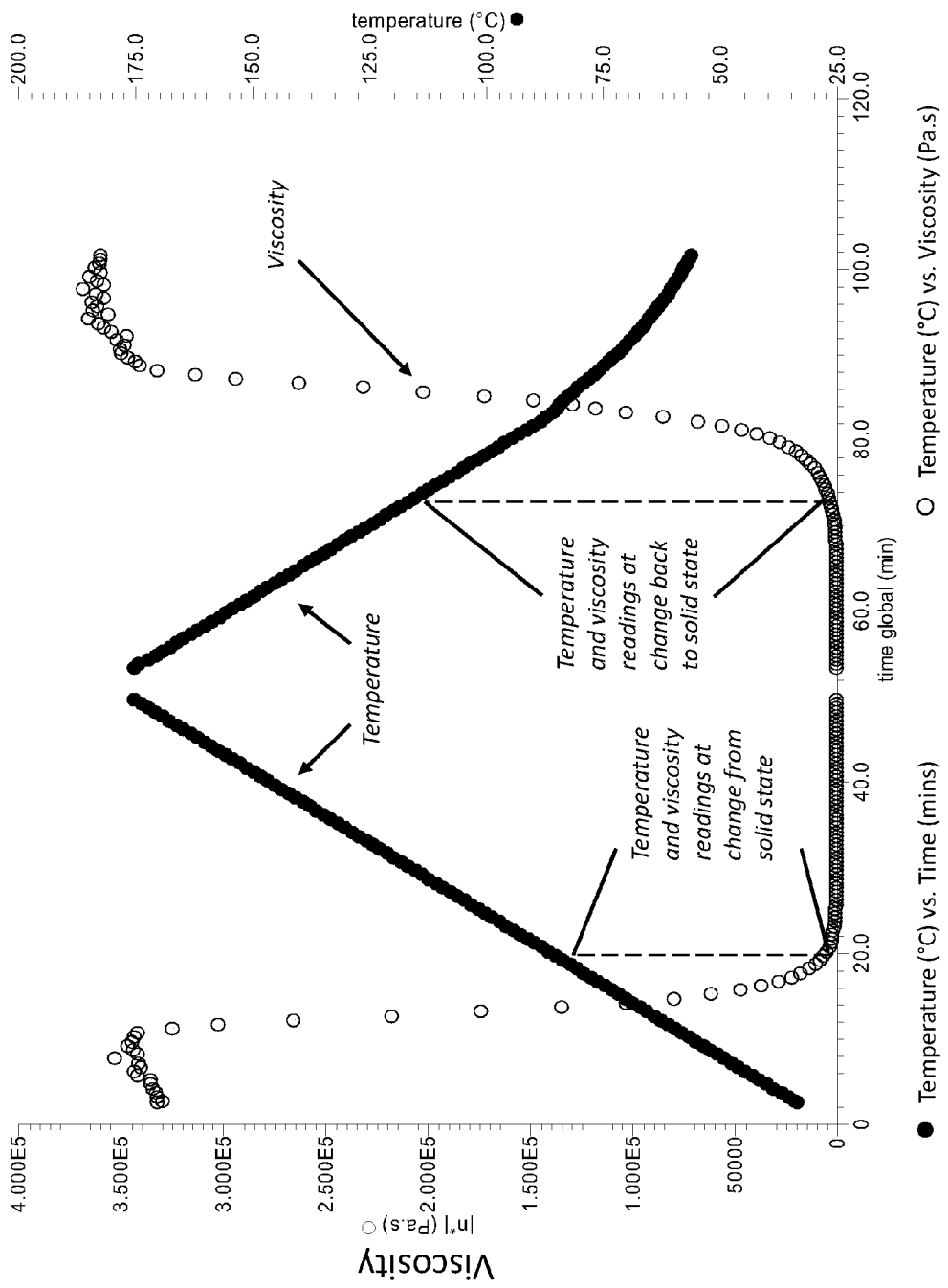
FIG. 1 is a graphical illustration depicting the rheology of an exemplary reversible thermoset adhesive through one heating and cooling cycle in accordance with one or more embodiments of the present disclosure.

Embodiments of the present disclosure are directed to reversible thermoset adhesives. Without being bound by theory, the thermally reversible bonding chemistry of the present disclosure is based on the Diels-Alder reaction described briefly and shown below. The Diels-Alder reaction is a temperature initiated cycloaddition organic chemical reaction between a diene and dienophile to form a cyclohexene. For Diels-Alder reactions which are reversible, the "reverse" reaction is called the retro-Diels-Alder reaction.

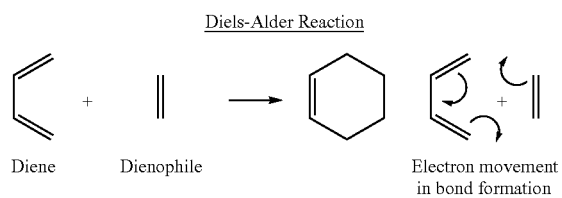

Diene    Dienophile         Electron movement
                            in bond formation Diels-Alder Reaction Various components are contemplated for utilization as the diene and dienophile in the Diels-Alder (DA) reaction and retro-DA reactions. For example, and not by way of limitation, one approach is to incorporate dienes, such as furans, and dienophiles, such as maleimides as shown in the reaction diagram below. Although any diene able to exist in the s-cis conformation is capable of undergoing the DA reaction, furans may be used as dienes due to their commercial availability and flexibility for functionalization. Using similar selection criteria, maleimides may be used as the dienophiles.

Without being bound by theory, DA cross-link formation between furans and maleimides is favored at mild temperatures between room temperature and 60° C. In some embodiments, at above 90° C., the reverse (retro) DA reaction is favored and the cross-links break.

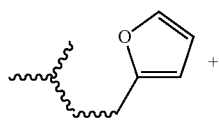

+

-continued

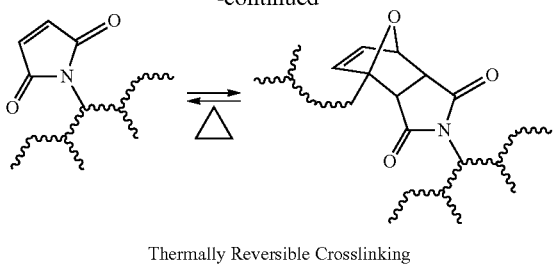

Thermally Reversible Crosslinking

An embodiment of the present disclosure demonstrates an adhesive system capable of losing adhesion by broken cross-links at room temperature or elevated temperatures, for example, about 90° C. or greater. In specific embodiments, the adhesive tensile strengths in the "set" state are in the range of 175 psi to 390 psi, and "reversed" state adhesive tensile strengths are less than about 5 psi, or less than about 3 psi.

As used herein, the "set" state means the cross-linked reversible polymer network produced by the DA reaction. In many embodiments described below, the "set" state may be a solid state; however, it is contemplated that the properties of the polymer network may be tailored or adjusted such that the "set" state is a liquid or semi-solid. Further as used herein, the "reversed" state means the physical state (e.g., liquid, gel, or semi-solid) achieved when the DA cross-links of the set state cross-linked reversible polymer network are broken by the retro-DA reaction.

As used herein, "semi-solid" is the boundary between liquid and solids and has a viscosity of about 100-300 Pa·s. The "liquid" is below this viscosity range, and the "solid" is above this viscosity range.

As used herein, "property-modifying molecular moiety" refers to a molecule which is co-cured with the diene and dienophile in the cured reversible polymer network of the reversible thermoset adhesive.

As used herein, the "heat-and-cool cycle" or "heating and cooling cycle" may refer to the transition from a "set" state to a "reversed" state via reverse-DA during a heating stage and a subsequent DA reaction during the cooling stage which transitions the reversible thermoset adhesive from the "reversed" state to a "set" state.

Embodiments of the present disclosure are directed to compositions including molecules capable of undergoing the DA reaction as described above. These molecules are designed to form reversible covalent chemical cross-links within a polymer matrix. In operation, dienes, dienophiles, and property-modifying molecular moieties react via the Diels-Alder reaction to form the thermoset adhesive comprising reversible covalent bonds. Various compositions are contemplated for the property-modifying molecular moieties. In one embodiment of the present disclosure, the property-modifying molecular moieties comprise prepolymer resins, epoxies, diisocyanates, polyols, polyamines, polymercaptans, or combinations thereof. Additionally, the thermoset adhesive may then be cured using a curing agent. Various compositions are contemplated for the curing agent. In one embodiment of the present disclosure, the curing agent comprises low molecular weight multi-functional anhydrides, amines, alcohols, mercaptans, or combinations thereof.

Figure 2:
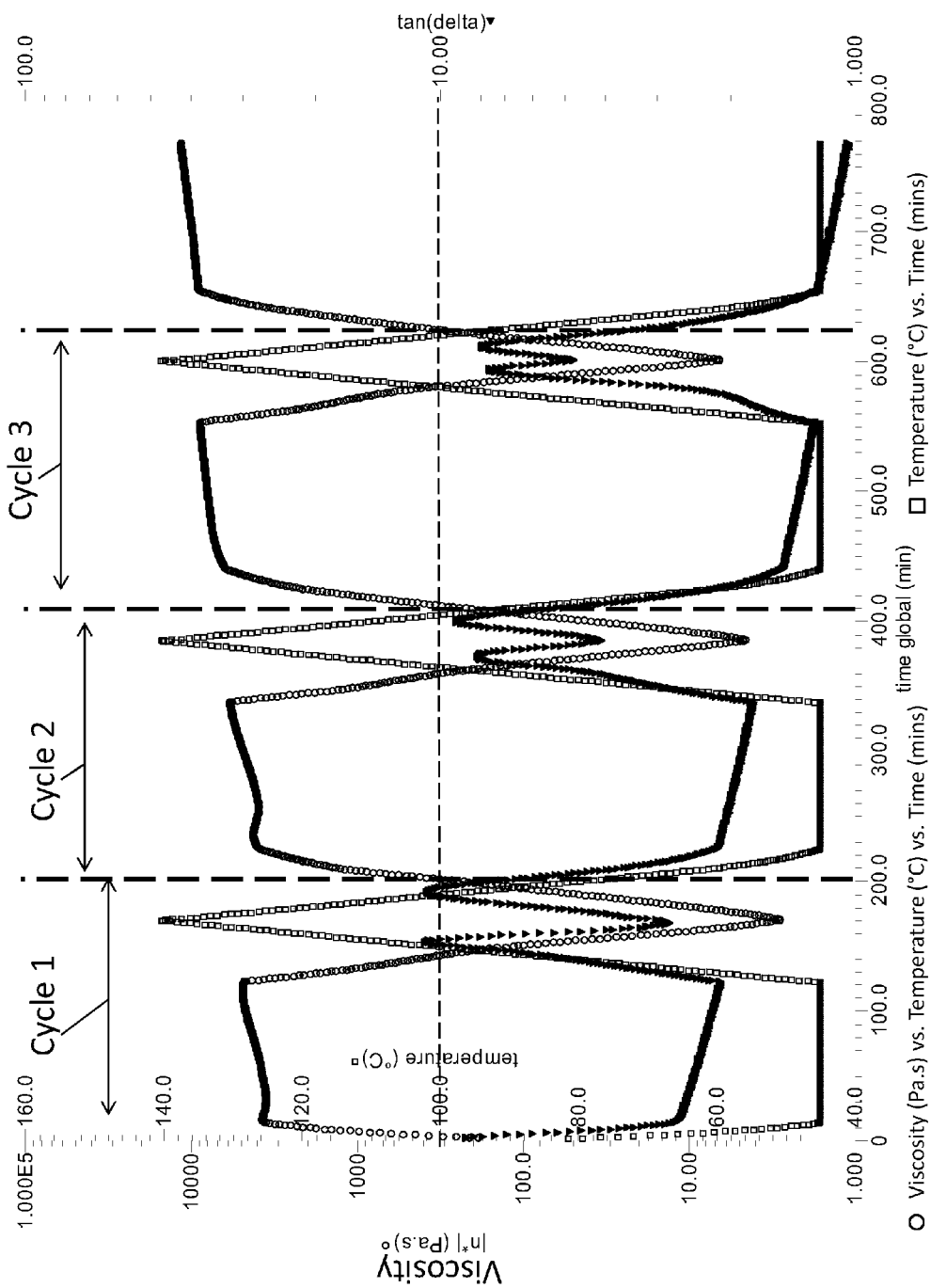
FIG. 2 is a graphical illustration depicting the rheology of an exemplary reversible thermoset adhesive through three heating and cooling cycles in accordance with one or more embodiments of the present disclosure.
Figure 3:
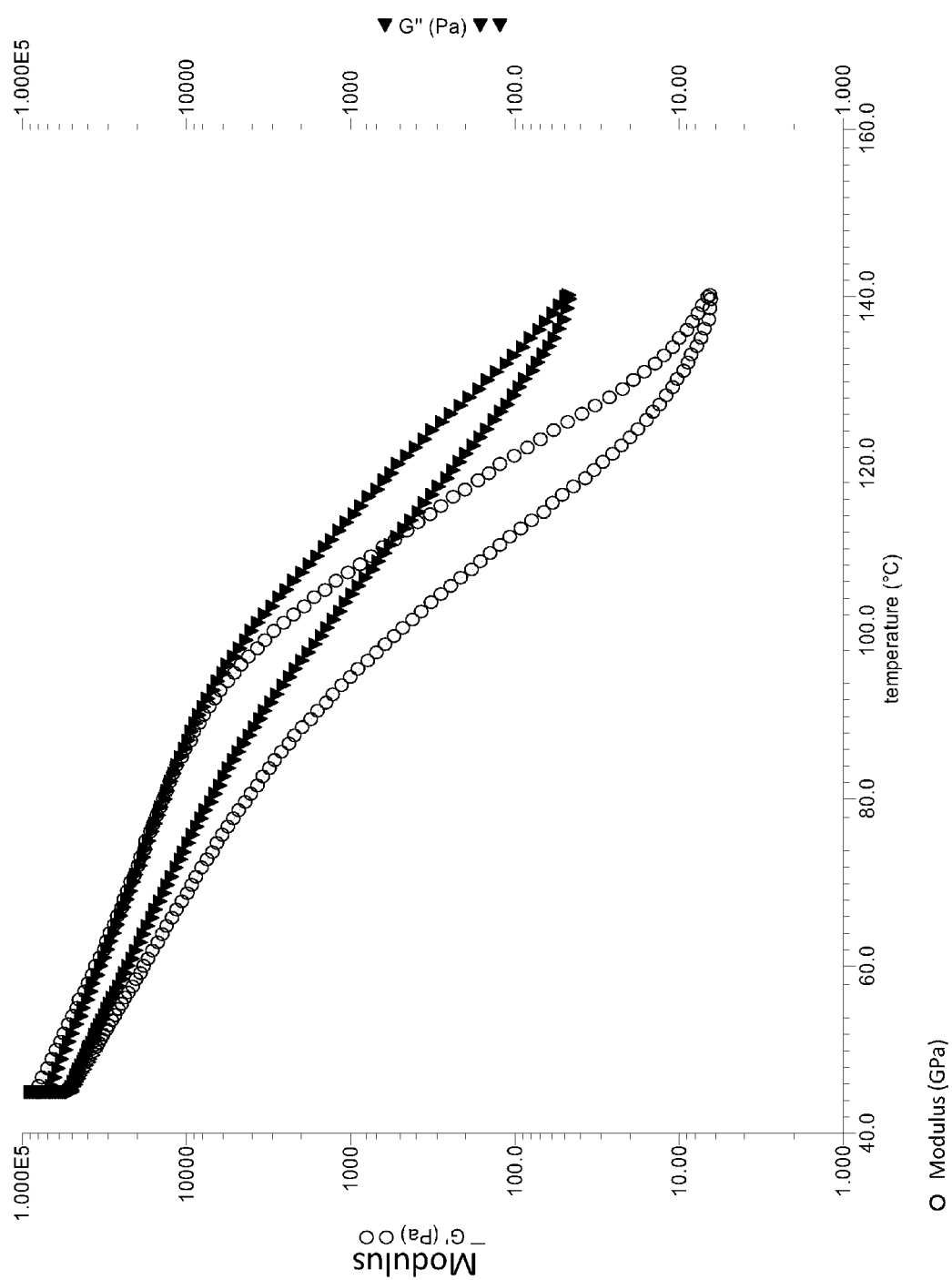
FIG. 3 is a graphical illustration depicting the shear modulus of an exemplary reversible thermoset adhesive through one heat and cool cycle in accordance with one or more embodiments of the present disclosure.

As stated above, the reversible thermoset adhesive transitions from a solid "set" state, in which the reversible thermoset adhesive has been cross-linked, to a liquid, "reversed" state, in which the reversible thermoset adhesive has been uncross-linked (i.e. the Diels-Alder cross-linking has been reversed). In an alternative embodiment of the present disclosure, the reversible thermoset adhesive transitions from a solid "set" state to a semi-solid, "reversed" state. These transitions may remain for at least one cycle or may remain for three or more cycles as shown in FIG. 2. Referring to FIG. 3, the reversible thermoset adhesive exhibits a change in shear modulus (in GPa) of 1 to 6 orders of magnitude upon converting from a set state to a reversed state, or from about 2 to 4 orders of magnitude. The shear modulus of the reversible thermoset adhesive is specific to the chemical make-up of the reversible thermoset adhesive and demonstrates the ability to tailor the reversible thermoset adhesive based on use and temperature exposure. Moreover, these transitions to the reversed state exhibit viscosity values in the liquid or semi-solid state having a viscosity of 300 Pa·s or less, or 100 Pa·s or less. This is considered a marked improvement over conventional cured thermoset adhesives, which tend to achieve viscosity minimums of 1000 Pa·s or more.

Because the reversible thermosetting systems can exist in two physical states, it may be beneficial in one or more embodiments to utilize one or more property-modifying molecular moieties, because these property-modifying molecular moieties will dictate the properties of the "reversed" non-Diels-Alder-cross-linked state in addition to the cross-linked "set" state. In the case that the reversible thermoset is designed to "reverse" into a liquid, properties such as viscosity and chemical stability of the liquid can be tailored by controlling the size and chemistry of the property-modifying molecular moiety. In an alternative material, where the material is designed to uncross-link into a solid, yet softer or more flexible state than the cross-linked state, selection of an appropriate molecular moiety or multiple molecular moieties can influence properties such as the flexibility, hardness, and elasticity of the "set" and "reversed" states.

The composition of the property-modifying molecular moieties between the diene and/or dienophile moieties within the polymer network is dependent on the application of the reversible thermoset. Such molecular moieties can be monomeric, oligomeric or polymeric in nature, as evident from the examples that are provided in the embodiment. The final properties of the reversible adhesive material are largely dictated by the design of the performance- or properties-modifying molecular moieties modifier. Mechanical properties, thermal properties, optical properties, electrical properties, and cure conditions can all be tailored through the selection of appropriate property-modifying molecular reagents that co-cure with the diene and dienophile to form the reversible adhesive. By understanding this concept, embodiments of both elastomeric and high-modulus reversible thermosets capable of undergoing their thermosetting reaction at both elevated temperatures and room-temperature have been formed.

In one or more embodiments, the property-modifying molecular moieties are chemically integrated or covalently bonded during the curing process between the diene or dienophile molecules to form the resulting polymer network. Specifically, the one or more property-modifying molecular moieties are reversibly cross-linked such that a backbone of the reversible thermoset adhesive comprises the one or more dienes, the one or more dienophiles, and the one or more property-modifying molecular moieties. In this case, the diene molecule, the dienophile molecule, and property-modifying molecular moieties are not joined to the backbone as pendant groups or as a side-chain to the backbone of the reversible thermoset adhesive, but instead are chemically integrated into the backbone.

As stated above, the dienes may comprise furans, for example, the furan based structure of formula I

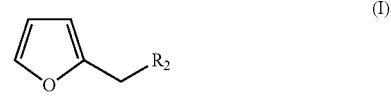

(I)

and the dienophiles may comprise maleimides, for example, the structure of formula II:

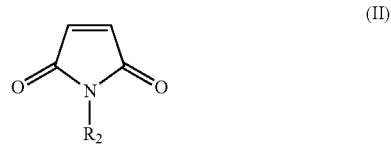

(II)

wherein $R_1$ is selected from the group consisting of: amines, alcohols, thiols, isocyanates, methacrylates, alkyl esters, benzoates, isothiocyanates, aldehydes, maleimides, thioureas, and thiosemicarbazides; and wherein $R_2$ is selected from the group consisting of: hydrogen, alkyls, aromatics, and aliphatics. In one embodiment of the present disclosure, the reversible cross-linking is covalent.

The flexibility of functionalization of furans allows for a wide range of reversible thermosets to be formulated. Suitable furans may include furfurylamine, furfuryl alcohol, furfuryl mercaptan, furfuryl isocyanate, furfuryl methacrylate, furfuryl alkyl esters, furfuryl benzoate, furfuryl isothiocyanate, furaldehyde, furfurylmaleimide, 1-(2-furfuryl)-2-thiourea, 4-(2-furfuryl)-3-thiosemicarbazide, or combinations thereof, all of which being suitable to incorporate DA reversibility into a variety of polymer systems.

The maleimide dienophiles may comprise 1,6'-bismaleimide-(2,2,4-trimethyl)hexane, 2,2'-bis[4-(4-maleimidophenoxy)phenyl]propane) or, 4,4'-bismaleimidodiphenylmethane. Aside from similar functionalities as those listed for the furans, maleimides also come in the form of various bismaleimide (BMI) resins including BMI-TMH, BMI-4000 (2,2'-bis[4-(4-maleimidophenoxy)phenyl]propane) and Compimide MDAB (4,4'-bismaleimidodiphenylmethane), the structures of which are below.

BMI-4000

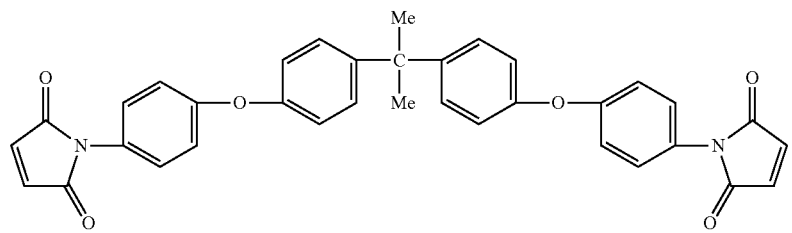

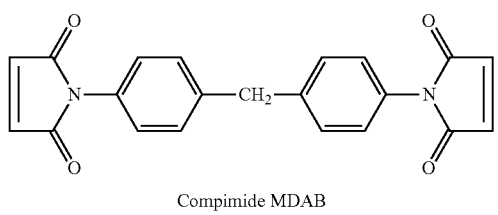 [SMILES: O=C1C=CC(=O)N1c1ccc(Cc2ccc(N3C(=O)C=CC3=O)cc2)cc1]

Compimide MDAB

The one or more property-modifying molecular moieties are selected from the group consisting of diisocyanate prepolymer, an amine prepolymer, a hydroxyl prepolymer, an epoxy resin, a cyanuric acid, a melamine, and combinations thereof which may comprise bisphenol A diglycidyl ether resin. The chemistry of the property-modifying molecular moieties can be obtained from any reactive species. Common prepolymer resins such as epoxies, diisocyanates, polyols, polyamines, cyanate ester and mercaptan-terminated prepolymer can all be incorporated into the reversible thermoset system to form the property-modifying molecular moieties, and exemplary embodiments of the present disclosure include specifically formulated reversible materials using isocyanate-, hydroxyl-, amine-, and epoxy-terminated resins. In one or more embodiments, the property-modifying molecular moieties have a molecular weight of greater than about 500, or greater than about 1000.

When forming the reversible thermoset adhesive, at least one curing step is performed. While not required in all embodiments, the curing step may utilize a curing agent to facilitate the curing of the reversible thermoset adhesive. Upon curing, the curing agent is incorporated into the structure of the reversible thermoset adhesive through a covalent bond. Various curing agents are contemplated herein. For example, these curing agents may include low molecular weight anhydrides, amines, alcohol, mercaptans and combinations thereof. In specific embodiments, the curing agent compositions may be tailored to be multi-functional. For example, multi-functional amines or alcohols are contemplated herein. As used above, "low" means a molecular weight less than 350; however, various molecular weights for the curing agents are contemplated herein. For example, curing agents may include a molecular weight of from about 100 to about 500, or from about 100-350, or from about 100 to about 300, or from about 100 to about 250. Exemplary embodiments of the present disclosure include Ethacure 100 and N,N,N',N'-tetrakis(2-hydroxypropyl)ethylenediamine.

In specific embodiments of the present disclosure, the dienes of the reversible thermoset adhesive are selected from the group consisting of furfuryl amine, furfuryl alcohol, and combinations thereof while the dienophiles may comprise bis-maleimide, which defines a symmetrical or an unsymmetrical structure. Various other diene and dienophile combinations, optionally with property-modifying molecular moieties, are contemplated herein. For examples, instead of mixing dienes, dienophile and property-modifying molecular moieties at the same time, chemical reagents that are Diels-Alder adduct, such as dicyclopentadiene derivatives can be mixed with the property modifying molecular moieties and cured to form the reversible thermoset adhesive. Other combinations of reagents that are adducts between dienes and property-modifying molecular moieties, or adducts between dienophile and property-modifying molecular moieties, can be reacted with the remaining components (i.e. dienophiles or dienes, respectively) to form the reversible thermoset adhesive. For example and not by way of limitation, these combinations may include: furfurylamine and any BMI resin; furfurylamine, any BMI resin, and any diisocyanate prepolymer; furfurylamine, any BMI resin, and any epoxy resin; furfuryl alcohol, any BMI resin, and any diisocyanate prepolymer; furfuryl alcohol, any BMI resin, and any epoxy resin; furfuryl isocyanate, any BMI resin, and any amine cure agent; furfuryl isocyanate, any BMI resin, and any hydroxyl cure agent; furfuryl isocyanate, any BMI resin, and cyanuric acid (creates cyanate ester-like thermoset); furfuryl isocyanate, any BMI resin, and melamine (creates cyanate ester-like thermoset); furaldehyde, any BMI resin, and any amine cure agent; furfuryl mercaptan, any BMI resin, and any diisocyanate prepolymer; furfuryl mercaptan, any BMI resin, and any epoxy resin; or furfuryl isothiocyanate, any BMI resin, and any amine cure agent.

Various amounts of diene and dienophile are also contemplated as dictated by the industrial application in which the reversible thermoset adhesive is utilized. For example, the reversible thermoset adhesive may comprise from about 12% by wt to about 35% by wt of dienes, and from about 25% wt to about 55% by wt of dienophiles. Further, it is contemplated that the remaining % by wt is comprised of the one or more property-modifying molecular moieties.

Referring to the FIGS., the change in mechanical properties caused by the reversible cross-linking is often readily apparent visually. Observing the material change from a solid to a liquid is often used to qualitatively verify reversibility. The reversing of the thermoset can be directly measured or observed by a variety of means. In one embodiment of the present invention, the reversible thermoset has been formulated to reverse to a liquid; this transition can be quantifiably measured on a rheometer or viscometer. A rheometer measures both the "set" and "reversed" physical states as well as the transitions between physical states (See FIG. 1). To quantitatively measure cyclic reversibility a rheometer may be used (See FIGS. 2 and 3).

Referring to FIG. 1, depicts the rheology of the reversible thermoset adhesive of the first formulation over a heating and cooling cycle. During the first 55-60 minutes, the reversible thermoset adhesive is heated from about room temperature to about 175° C. At minute 20, the reversible thermoset adhesive completes the transition from the solid state as indicated by the viscosity values. At temperatures between 80 to 175° C., the viscosity values are very low (less than 300 Pa·s), thus, the reversible thermoset adhesive has transitioned from the set solid state to the reversed liquid state. During the cooling stage (approximately from the 60 to 100 minute marks), the viscosity starts to increase at about minute 70 and a temperature of 125° C. until it reaches solid form as the reversible thermoset further cools.

A typical reversible thermoset adhesive can be reversed for at least one cycle as shown in FIG. 1 or for 3 or more cycles as shown in FIG. 2. The dotted line at 300 Pa·s approximates the point at which the physical state changes. As shown, Cycle 1 starts at approximately 95° C. and cools to 40° C. (where the reversible thermoset adhesive transitions from liquid or semi-solid to solid), is heated to about 140° C. (where the reversible thermoset adhesive transitions to liquid state), and then is cooled back to 95° C. As shown, Cycle 2 and Cycle 3 follow the same path, demonstrating that the reversible thermoset adhesive can reverse over multiple cycles. FIG. 3 is an alternative representation of the same data presented in FIG. 2, with graph plotted as material's viscoelastic properties (i.e. shear modulus in FIG. 3) plotted against temperature instead of time as in FIG. 2. FIG. 3 shows that as the temperature increases in the first heat-cool cycle shown in FIG. 2, the shear modulus decreases, and as the temperature decreases, the shear modulus increases. The data demonstrates the reversibility of the material by showing that the material's shear modulus goes through the cycle and arrives back at about the same modulus value at around 45° C.

An adhesion tester, such as a DeFelsko Positester adhesion tester, may be used to verify the reversibility in reversible thermoset adhesives. Specifically, a lower pull-off strength for the "reversed" state and a higher strength for the "set" state may be verified.

Figure 4:
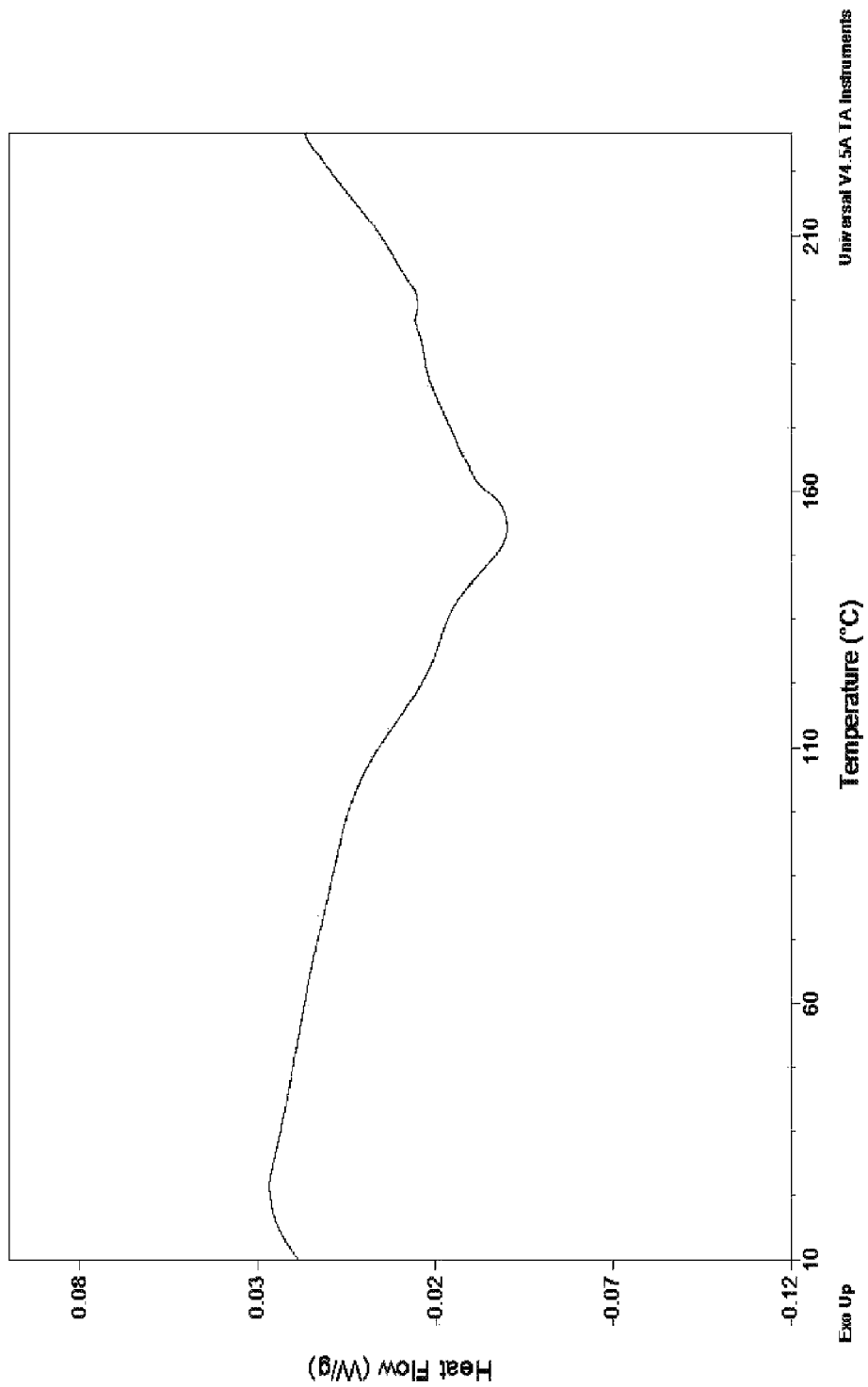
FIG. 4 is a differential scanning calorimetry (DSC) diagram of an exemplary reversible thermoset adhesive in accordance with one or more embodiments of the present disclosure.

Referring to FIG. 4, a differential scanning calorimetry (DSC) diagram may be used to identify the temperature at which the reversed state occurs. As can be seen from the endothermic chemical reaction peak at about 160°, the retro-Diels-Alder reaction begins at around 100° C. This corresponds well to the change in viscosity that occurred when the material was changing to the "reversed" state. The presence of an endothermic peak in the DSC thermogram indicates a reaction is occurring for the reversible thermoset adhesive i.e., the cross-links are breaking down via the retro-DA reaction. In contrast, a thermoplastic adhesive will show only a glass transition of much lower magnitude in terms of heat flow. Without being bound by theory, the thermoplastic adhesive exhibits a lower magnitude of heat flow, because the thermoplastic merely melts or solidifies. It does not undergo a reaction like the reversible thermoset adhesive, which generates an endotherm via the cross-link breaking during the retro-DA process.

Example Formulations

The following exemplary formulations are provided for convenience. The first formulation below is analyzed and depicted in FIG. 1, while FIGS. 2-4 analyze and depict the second formulation below.

A first example formulation consists of the following: 14.8% by wt. furfurylamine; 46.9% by wt. 1,6'-bismaleimide-(2,2,4-trimethyl)hexane (BMI-TMH); 9.4% by wt. Polycaprolactone diol (MW ~530); and 28.9% by wt. Adiprene LF 700D.

In this specific formulation, room-temperature curing of the thermoset was achieved by incorporating a furan with an amine functionalization (furfurylamine) and an isocyanate-terminated prepolymer (Adiprene). Substituting these components for furfuryl isocyanate and an amine- or hydroxyl-prepolymer provides an equally applicable approach to room-temperature curing. The remaining 50% of the BMI was provided by the dienophile component. The BMI-TMH is first divided into two equal portions by mass. To one fraction of BMI-TMH is added the furfurylamine and polycaprolactone diol at 135° C. This solution is mixed and allowed to react for 20 minutes. The BMI-TMH and furfurylamine react to generate a structure having two secondary amines that carry the diene functionality. During this time, Adiprene LF 700D is mixed into the second fraction of BMI-TMH, which carries the dienophile. Upon the elapse of twenty minutes, the two fractions are mixed together. At this point, the bonding of substrates or the molding or a specimen can occur. The sample cures at room temperature and is able to be handled after 15 minutes.

A second example formulation consists of the following: 16.1% (wt.) Furfurylamine; 26.5% by wt. 1,6'-bismaleimide-(2,2,4-trimethyl)hexane (BMI-TMH); and 57.4% by wt. Bisphenol A Diglycidyl ether resin (MW 345).

This material was formulated to be much more rigid than the material described above. However, due to the epoxy-amine reaction that must occur, an elevated cure was necessary for this particular formulation.

A third example formulation consists of the following: 5.4% (wt.) Furfuryl alcohol; 8.6% (wt.) 1,6'-bismaleimide-(2,2,4-trimethyl)hexane (BMI-TMH); 62.0% (wt.) Polycaprolactone diol $M_n$ ~1250; 23.5% Isonate 143L; 0.5% (wt.) N,N,N',N'-tetrakis(2-hydroxypropyl)ethylenediamine Applications for the above-described reversible thermoset adhesive include: reversible and/or removable adhesives and appliqués that can be formulated to be either a structural or pressure-sensitive adhesive that reverses to lose adhesion; melt-processable thermosets for extrusion and casting that create thermoplastic-like processability with the benefit of thermoplastic thermal and mechanical properties; recyclable or recoverable resins; healable resins; passive-adaptive, smart systems such as smart mechanisms to vent a pressure vessel when overheated; reversibly soluble/insoluble molecules or polymers with specifically tuned chemical stability which could be beneficial in polymer etching and recovery applications; reworkable adhesive for bonding various structures, including but not limited to: military aviation platforms, computer processors, transmit/receive modules, and power amplifiers, the solution can be applied to commercial aircraft, computer processor heat sinks, other computer components, commercial electronics, and personal/portable electronics.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A reversible thermoset adhesive comprising:
   a reversibly cross-linked polymer network comprising about 12% to about 35% by weight of one or more dienes, about 25% to about 55% by weight of one or more dienophiles, and one or more property-modifying molecular moieties;
   wherein the one or more dienes comprise the formula I and the one or more dienophiles comprise the formula II:

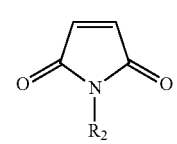

(II)

wherein $R_2$ is selected from the group consisting of hydrogen, alkyls, aromatics, aliphatics, heteroaromatics, and heteroaliphatics
   wherein the reversibly cross-linked polymer network is operable to be in a set state or a reversed state, wherein the reversed state is a liquid or semi-solid state having a viscosity of 300 Pa·s or less.

2. The reversible thermoset adhesive of claim 1 wherein the property-modifying molecular moieties are chemically integrated between the diene and dieneophile molecules by covalent bonds.

3. The reversible thermoset adhesive of claim 1 wherein the one or more dienophiles are selected from the group consisting of 1,6'-bismaleimide-(2,2,4-trimethyl)hexane, 2,2'-bis[4-(4-maleimidophenoxy)phenyl]propane), and 4,4'-bismaleimidodiphenylmethane.

4. The reversible thermoset adhesive of claim 1 wherein the dienophile is a bis-maleimide.

5. The reversible thermoset adhesive of claim 1 wherein the one or more property-modifying molecular moieties are selected from the group consisting of diisocyanate prepolymer, an amine prepolymer, a hydroxyl prepolymer, a mercaptan-terminated prepolymer, an epoxy resin, a cyanuric acid, a melamine, and combinations thereof.

6. The reversible thermoset adhesive of claim 5 wherein the one or more property-modifying molecular moieties is bisphenol A diglycidyl ether resin.

7. The reversible thermoset adhesive of claim 1 wherein the reversible thermoset adhesive further comprises a curing agent covalently bonded in the reversibly cross-linked polymer network.

8. The reversible thermoset adhesive of claim 7 wherein the curing agent comprises low molecular weight anhydrides, amines, alcohols, mercaptans, or combinations thereof.

9. The reversible thermoset adhesive of claim 1 wherein the reversible thermoset adhesive is operable to transition from a solid state to a liquid state, from a solid state to a semi-solid state, from a semi-solid state to a liquid state, from a liquid state to a semi-solid state, from a semi-solid state to a solid state, from a liquid state to a solid state, or combinations thereof.

10. The reversible thermoset adhesive of claim 1 wherein the reversible thermoset adhesive exhibits a change in shear modulus (in GPa) of 1 to 6 orders of magnitude upon converting from a set Diels-Alder state to a reversed Diels-Alder state.

11. The reversible thermoset adhesive of claim 1 wherein the reversible thermoset adhesive exhibits reversibility from solid to a liquid or semi-solid for at least one heat-and-cool cycle.

12. The reversible thermoset adhesive of claim 11 wherein the reversible thermoset adhesive exhibits reversibility from solid to a liquid or semi-solid for 3 or more heat-and-cool cycles.

13. The reversible thermoset adhesive of claim 1 wherein the reversed state is a liquid having a viscosity of 100 Pa·s or less.

14. The reversible thermoset adhesive of claim 1 wherein the reversed state is a liquid or semi-solid state having an adhesive tensile strength of 5 psi or less.

15. The reversible thermoset adhesive of claim 14 wherein the reversed state is a liquid or semi-solid state having an adhesive tensile strength of 3 psi or less.

16. A method for making the reversible thermoset adhesive of claim 1 comprising:
providing the one or more dienes, the one or more dienophiles, and the one or more property-modifying molecular moieties;
reacting the dienes, dienophiles, and property-modifying molecular moieties using a Diels-Alder reaction to form a thermoset adhesive comprising reversible covalent bonds; and
curing the thermoset adhesive to yield the reversible thermoset adhesive.

17. The method of claim 16 wherein the curing step utilizes a curing agent.

18. The method of claim 17 wherein the curing agent comprises multi-functional low molecular weight anhydrides, amines, alcohols, mercaptans, or combinations thereof.

19. The method of claim 16 wherein the one or more dienophiles comprise
maleimides, bismaleimides, or bismaleimide resins.

20. The method of claim 16 wherein the one or more property-modifying molecular moieties are selected from the group consisting of a diisocyanate prepolymer, an amine prepolymer, a hydroxyl prepolymer, a mercaptan-terminated prepolymer an epoxy resin, a cyanuric acid, a melamine, and combinations thereof.

21. The method of claim 16 wherein the reversed state is a liquid or semi-solid state having an adhesive tensile strength or 5 psi or less.

22. The method of claim 16 wherein the reversible thermoset adhesive exhibits reversibility from solid to a liquid or semi-solid for at least one heat-and-cool cycle.

23. The method of claim 22 wherein the reversible thermoset adhesive exhibits reversibility from solid to a liquid or semi-solid for 3 or more heat-and-cool cycles.

* * * * *

UNITED STATES PATENT AND TRADEMARK OFFICE
CERTIFICATE OF CORRECTION

PATENT NO.       : 9,260,640 B1
APPLICATION NO.  : 13/973575
DATED            : February 16, 2016
INVENTOR(S)      : Mac Murray et al.

It is certified that error appears in the above-identified patent and that said Letters Patent is hereby corrected as shown below:

In the Claims

Col. 12, Claim 21, Line 34,
    "or 5 psi or less." should read
    --of 5 psi or less.--.

Signed and Sealed this
Nineteenth Day of July, 2016

Michelle K. Lee
*Director of the United States Patent and Trademark Office*